United States Patent
Suryavanshi

(10) Patent No.: US 9,313,164 B2
(45) Date of Patent: Apr. 12, 2016

(54) UPDATING RICH COMMUNICATION SUITE CAPABILITY INFORMATION OVER A COMMUNICATIONS NETWORK

(71) Applicant: QUALCOMM Incorporated, San Diego, CA (US)

(72) Inventor: Vijay Suryavanshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 13/925,066

(22) Filed: Jun. 24, 2013

(65) Prior Publication Data

US 2014/0378105 A1    Dec. 25, 2014

(51) Int. Cl.
| | |
|---|---|
| *H04L 12/58* | (2006.01) |
| *H04W 4/12* | (2009.01) |
| *H04L 29/06* | (2006.01) |
| *H04W 4/00* | (2009.01) |

(52) U.S. Cl.
CPC ............ *H04L 51/18* (2013.01); *H04L 65/1006* (2013.01); *H04L 65/1016* (2013.01); *H04L 65/1073* (2013.01); *H04L 69/24* (2013.01); *H04W 4/001* (2013.01); *H04W 4/12* (2013.01)

(58) Field of Classification Search
CPC ..... H04L 51/18; H04L 65/1016; H04L 69/24; H04W 4/001; H04W 4/12
See application file for complete search history.

(56) References Cited

U.S. PATENT DOCUMENTS

| | | | |
|---|---|---|---|
| 2011/0231544 A1 | 9/2011 | Javenpaa et al. | |
| 2012/0225652 A1* | 9/2012 | Martinez | H04M 3/42374 455/435.1 |
| 2012/0324009 A1 | 12/2012 | Lee et al. | |
| 2013/0024912 A1 | 1/2013 | Jeon | |

(Continued)

FOREIGN PATENT DOCUMENTS

| | | |
|---|---|---|
| EP | 2741541 A1 | 6/2014 |
| WO | 2013026327 A1 | 2/2013 |

OTHER PUBLICATIONS

"GSM Association—Rich Communication Suite 5.1 Advanced Communications Services and Client Specification—Version 2.0—pp. 251-482" May 3, 2013 XP055131363, Retrieved from the Internet URL: http://www.gsma.com/network2020/rcs/specs-and-product-docs/ [retrieved on Jul. 24, 2014] p. 358 p. 376-p. 377.
International Search Report and Written Opinion—PCT/US2014/043625—ISA/EPO—Feb. 5, 2015.
"GSM Association—Rich Communication Suite 5.1 Advanced Communications Services and Client Specification", Version 2.0, GSM Association, May 3, 2013, pp. 1-250, XP055131358, p. 75-p. 83.

(Continued)

*Primary Examiner* — Liton Miah
(74) *Attorney, Agent, or Firm* — Muncy, Geissler, Olds & Lowe, P.C.

(57) ABSTRACT

In an embodiment, a requesting UE configures an RCS capabilities request message to request a target UE to provide RCS capability information (i) for the target UE, and (ii) for a set of other UEs. The requesting UE transmits the configured RCS capabilities request message to the target UE. The target UE determines that the target UE has access to RCS capability information for at least one UE from the set of other UEs, and configures an RCS capabilities response message that indicates the RCS capability information (i) for the target UE and (ii) for the at least one UE. The target UE transmits the configured RCS capabilities response message to the requesting UE. In another embodiment, a given UE determines whether to perform an RCS capability information refresh operation based on whether RCS capability information for another UE is older than a priority-specific age threshold.

33 Claims, 13 Drawing Sheets

(56) References Cited

U.S. PATENT DOCUMENTS

| | | | |
|---|---|---|---|
| 2013/0054740 A1 | 2/2013 | Klein et al. | |
| 2013/0339520 A1* | 12/2013 | Jang | 709/224 |
| 2014/0134978 A1* | 5/2014 | Zitnik | H04W 4/14 |
| | | | 455/411 |
| 2014/0301258 A1* | 10/2014 | Belghoul | 370/311 |
| 2014/0379931 A1* | 12/2014 | Gaviria | H04L 65/1016 |
| | | | 709/227 |

OTHER PUBLICATIONS

GSM Association, "Rich Communication Suite 5.1 Advanced Communication Services and Client Sepcification Version 1.0," pp. 1-pp. 90, Aug. 13, 2012.

Partial International Search Report—PCT/US2014/043625—ISO/EPO—Oct. 15, 2014.

* cited by examiner

1X EV-DO EXAMPLE

UMTS / W-CDMA EXAMPLE #1

UMTS / W-CDMA EXAMPLE #2

*LTE EXAMPLE*

*eHRPD EXAMPLE*

IMS ARCHITECTURE EXAMPLE

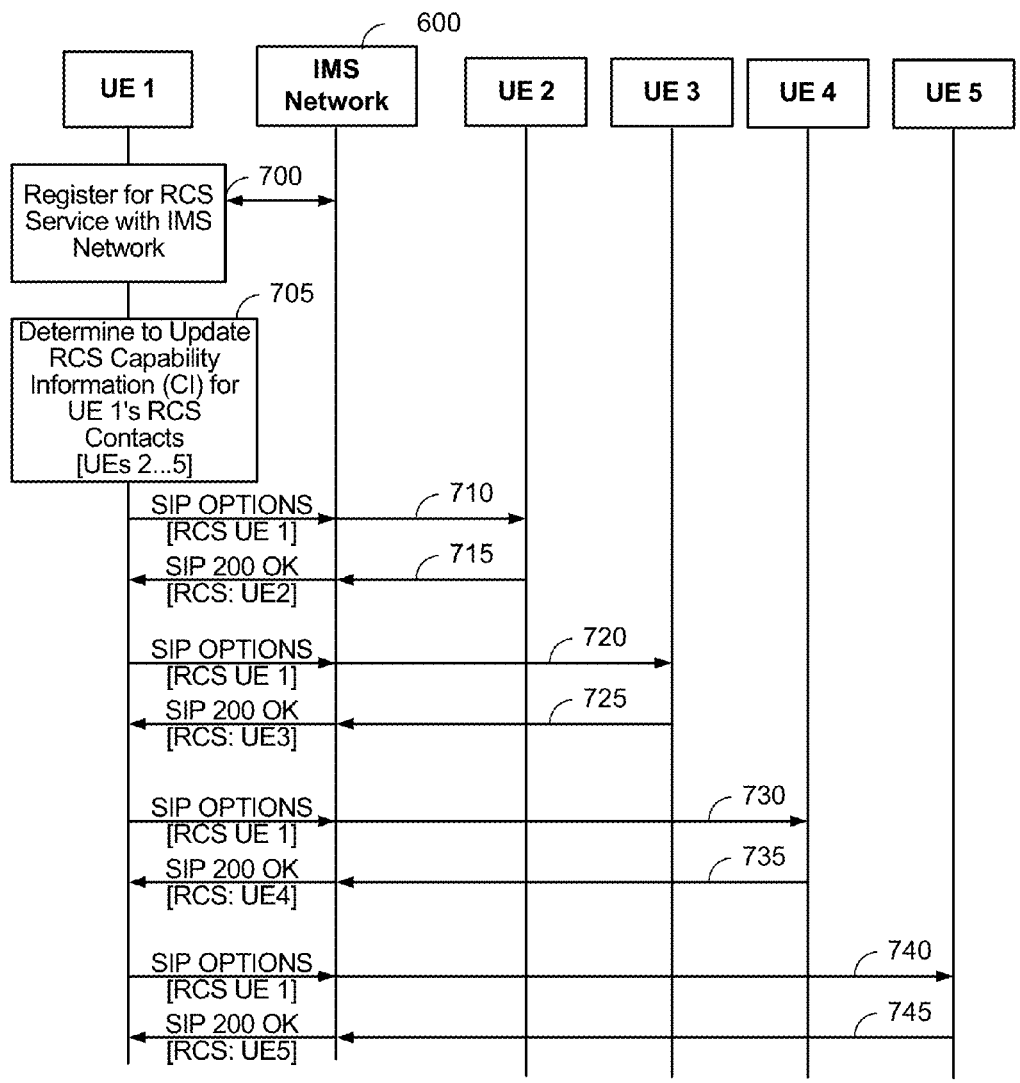
FIG. 7 - CONVENTIONAL ART - SIP OPTIONS MESSAGE SENT TO EACH TARGET UE FOR WHICH RCS CAPABILITY INFORMATION IS DESIRED

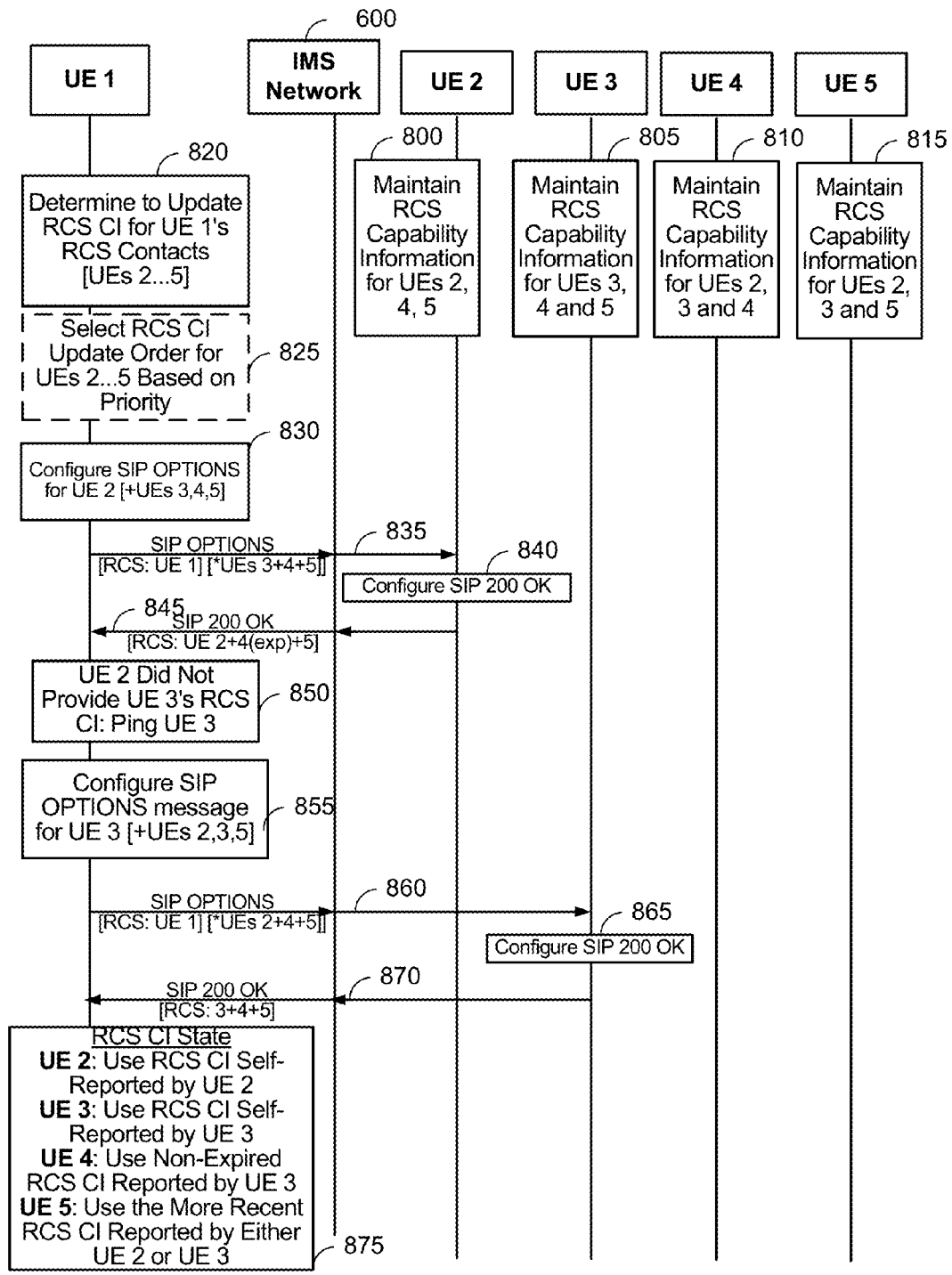
*FIG. 8* - SIP OPTIONS MESSAGE SENT TO A TARGET UE AND IS CONFIGURED TO REQUEST RCS CAPABILITY INFORMATION FOR MULTIPLE TARGET UES

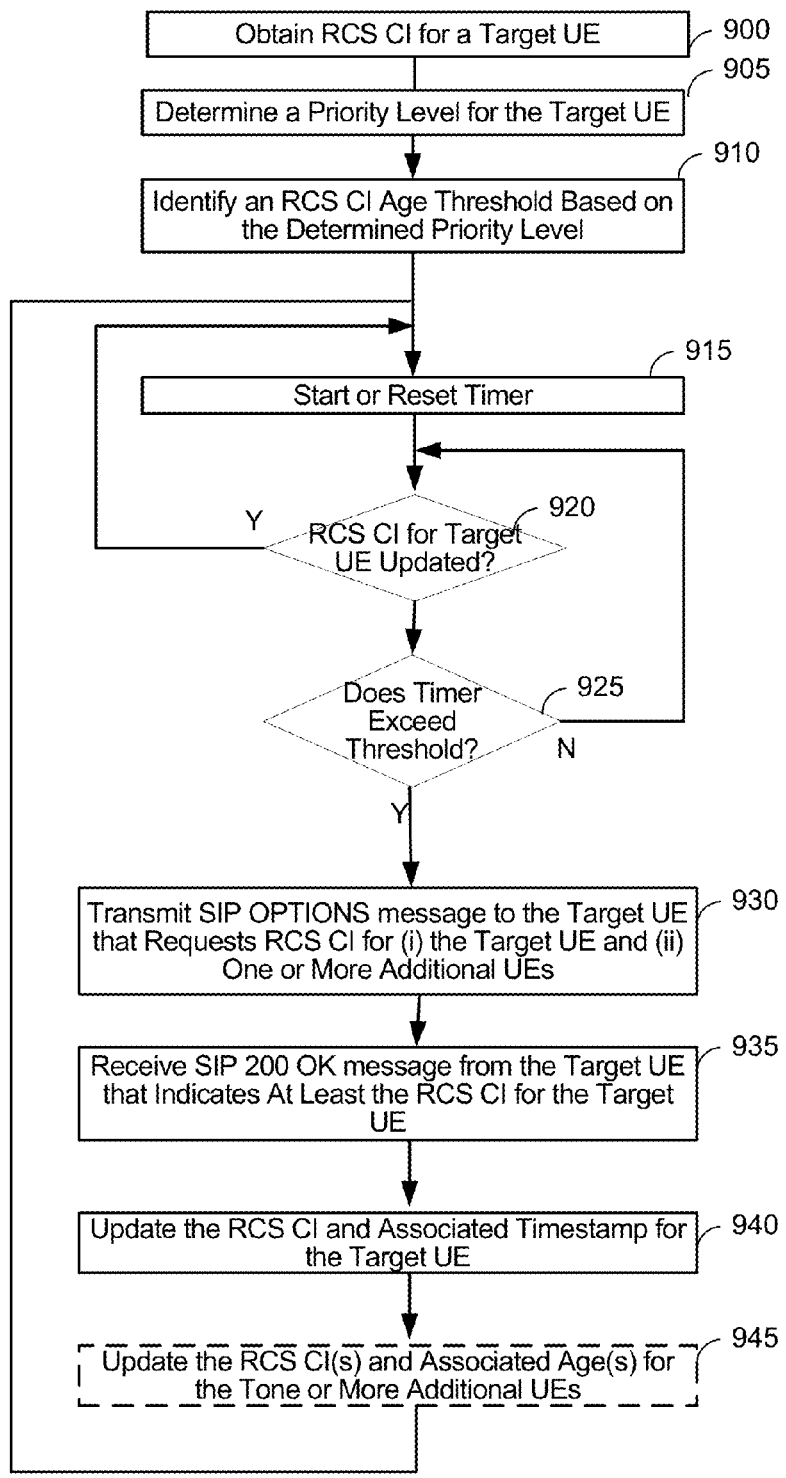
*FIG. 9 – UPDATING RCS CAPABILITY INFORMATION BASED ON PRIORITY*

UPDATING RICH COMMUNICATION SUITE CAPABILITY INFORMATION OVER A COMMUNICATIONS NETWORK

BACKGROUND OF THE INVENTION

1. Field of the Invention

Embodiments of the invention relate to updating rich communication suite (RCS) capability information over a communications network.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

Access networks using various communication protocols (e.g., 3GPP access networks such as W-CDMA, LTE, etc., or non-3GPP access networks such as WiFi, WLAN or wired LAN, etc.) can be configured to provide Internet Protocol (IP) Multimedia Subsystem (IMS) services via an IMS network managed by an operator (e.g., Verizon, Sprint, AT&T, etc.) to users across a communications system. Users that access the IMS network to request an IMS service are assigned to one of a plurality of regional application servers or application server clusters (e.g., groups of application servers that serve the same cluster region) for supporting the requested IMS service.

Rich Communications Suite (RCS) is a recently developed service-type in the IMS domain. RCS permits users to query device capabilities and/or application-level multimedia capabilities from their contacts, such that a client device can update the capabilities of the contacts in its address book in real-time and thus enable "rich communication", such as Voice over LTE (VoLTE), video calls, Instant Messaging (IM), file or image sharing, etc., based on the real-time capabilities of the contacts. In the current RCS standard, UEs send a UE-to-UE (or peer-to-peer) Session Initiation Protocol (SIP) OPTIONS message to one or more target UEs to request the UE-specific RCS capabilities of the target UEs. The SIP OPTIONS message includes the RCS capabilities of the transmitting UE, and the SIP OPTIONS message prompts the target UE to respond to the SIP OPTIONS message with a SIP 200 OK message that indicates the RCS capabilities of the target UE. Thus, the exchange of the SIP OPTIONS and SIP 200 OK messages is a peer-to-peer handshaking process that is mediated by the IMS network and by which both endpoints update their respective RCS capabilities for the other endpoint.

For example, UE 1 can send a SIP OPTIONS message to UE 2 over an IMS network that indicates UE 1's RCS capabilities and requests UE 2 to respond back to UE 1 with an indication of the RCS capabilities of UE 2, UE 1 can send a SIP OPTIONS message to UE 3 over the IMS network that indicates UE 1's RCS capabilities and requests UE 3 to respond back to UE 1 with an indication of the RCS capabilities of UE 3, and so on. UE 2 then responds to the SIP OPTIONS message from UE 1 with a SIP 200 OK message that indicates UE 2's RCS capabilities, UE 3 responds to the SIP OPTIONS message from UE 1 with a SIP 200 OK message that indicates UE 3's RCS capabilities, and so on.

As will be appreciated, in the current RCS standard, the overall messaging associated with RCS capability discovery scales linearly with the number of UEs for which RCS capability information is requested. In the example from above, if UE 1 desires to update the RCS capability for a high number of target UEs, this will in turn cause a relatively high amount of traffic between UE 1 and the target UEs.

SUMMARY

In an embodiment, a requesting UE configures an RCS capabilities request message to request a target UE to provide RCS capability information (i) for the target UE, and (ii) for a set of other UEs. The requesting UE transmits the configured RCS capabilities request message to the target UE. The target UE determines that the target UE has access to RCS capability information for at least one UE from the set of other UEs, and configures an RCS capabilities response message that indicates the RCS capability information (i) for the target UE and (ii) for the at least one UE. The target UE transmits the configured RCS capabilities response message to the requesting UE. In another embodiment, a given UE determines whether to perform an RCS capability information refresh operation based on whether RCS capability information for another UE is older than a priority-specific age threshold.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 7 illustrates a conventional process of discovering rich communication suite (RCS) capabilities for a group of contacts.

FIG. 8 is directed to an RCS capability discovery procedure in accordance with an embodiment of the present invention.

FIG. 9 illustrates a process by which a given UE determines whether to refresh the RCS capability information for a target UE based on a priority of the target UE in accordance with an embodiment of the invention.

DETAILED DESCRIPTION

Figure 1:
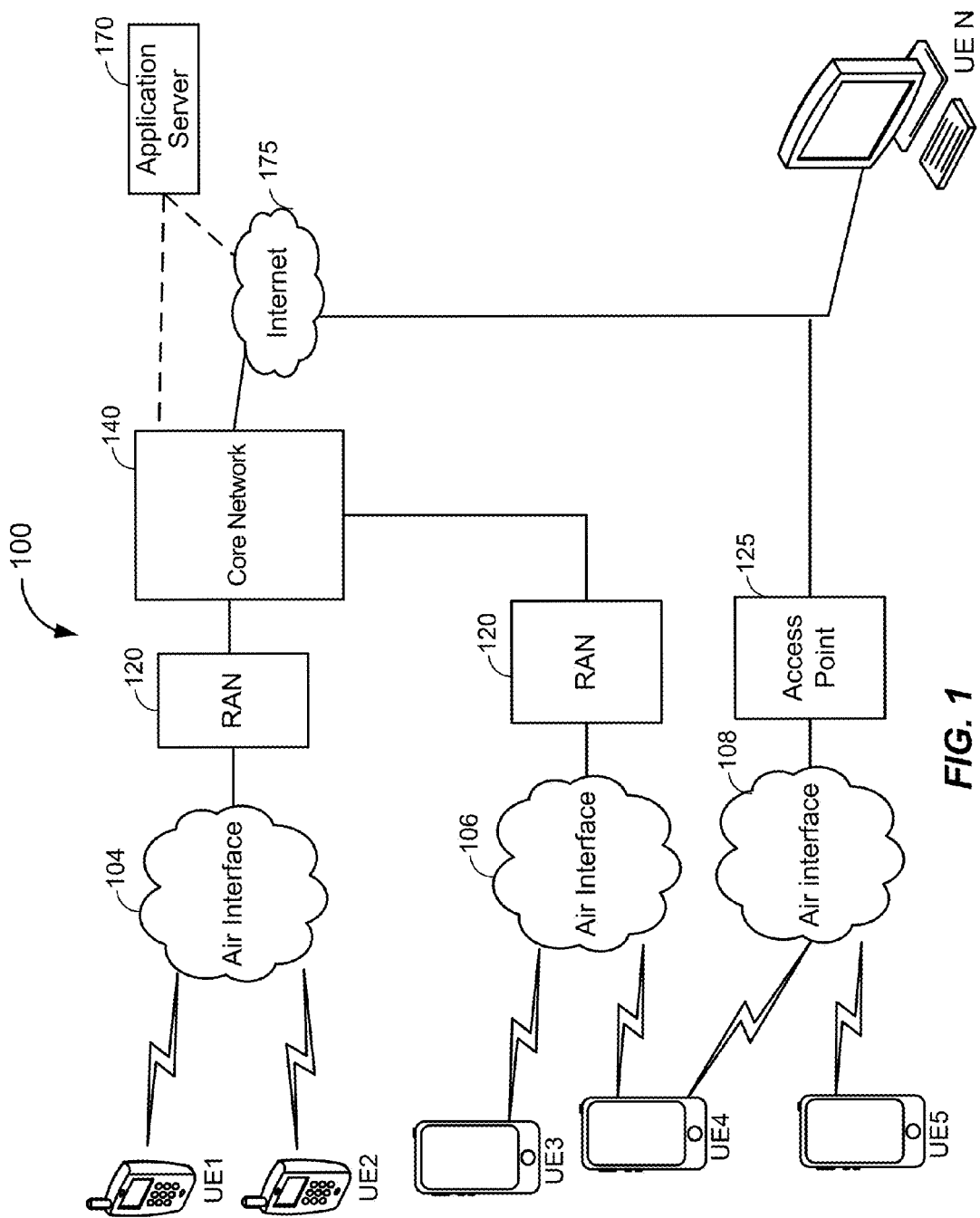
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 ... N. The UEs 1 ... N can include cellular telephones, personal digital assistant (PDAs), pagers, a laptop computer, a desktop computer, and so on. For example, in FIG. 1, UEs 1 ... 2 are illustrated as cellular calling phones, UEs 3 ... 5 are illustrated as cellular touch-screen phones or smart phones, and UE N is illustrated as a desktop computer or PC.

Referring to FIG. 1, UEs 1 ... N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 ... N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 correspond to components associated with supporting packet-switched (PS) communications, whereby legacy circuit-switched (CS) components may also be present in these networks, but any legacy CS-specific components are not shown explicitly in FIGS. 2A-2D.

Figure 2A:
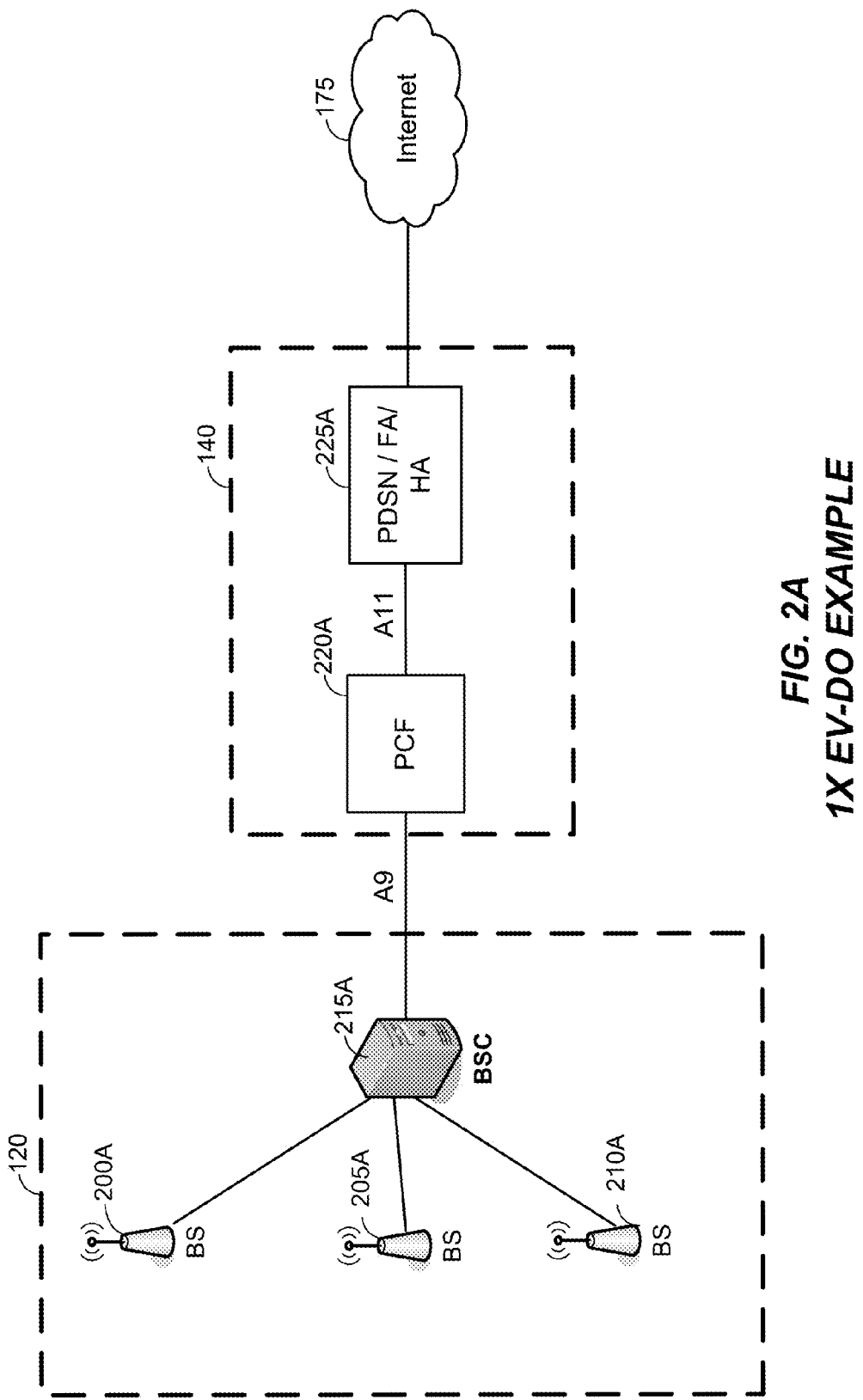
FIG. 2A illustrates an example configuration of a radio access network (RAN) and a packet-switched portion of a core network for a 1x EV-DO network in accordance with an embodiment of the invention.

FIG. 2A illustrates an example configuration of the RAN 120 and the core network 140 for packet-switched communications in a CDMA2000 1x Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
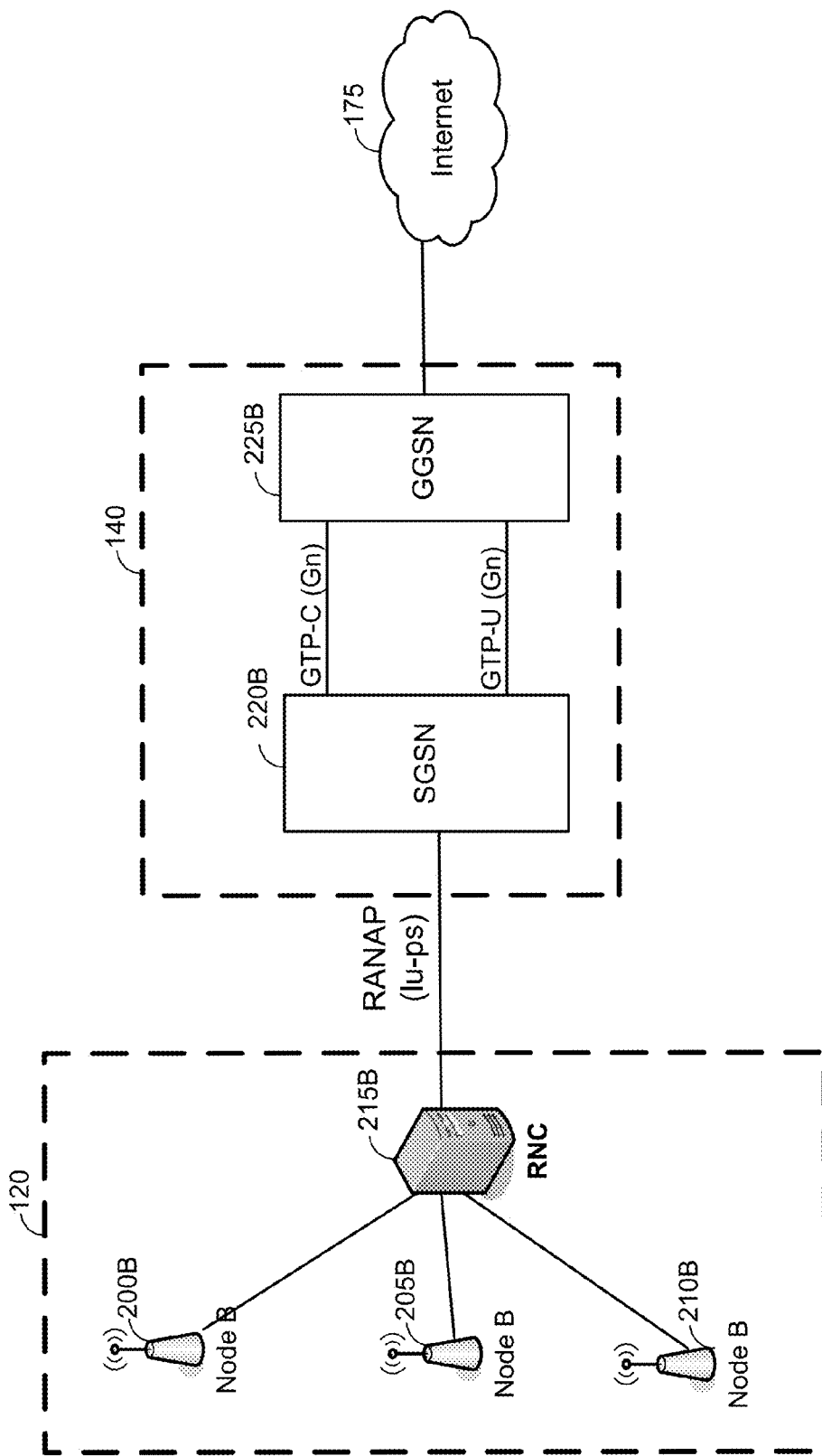
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1x EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
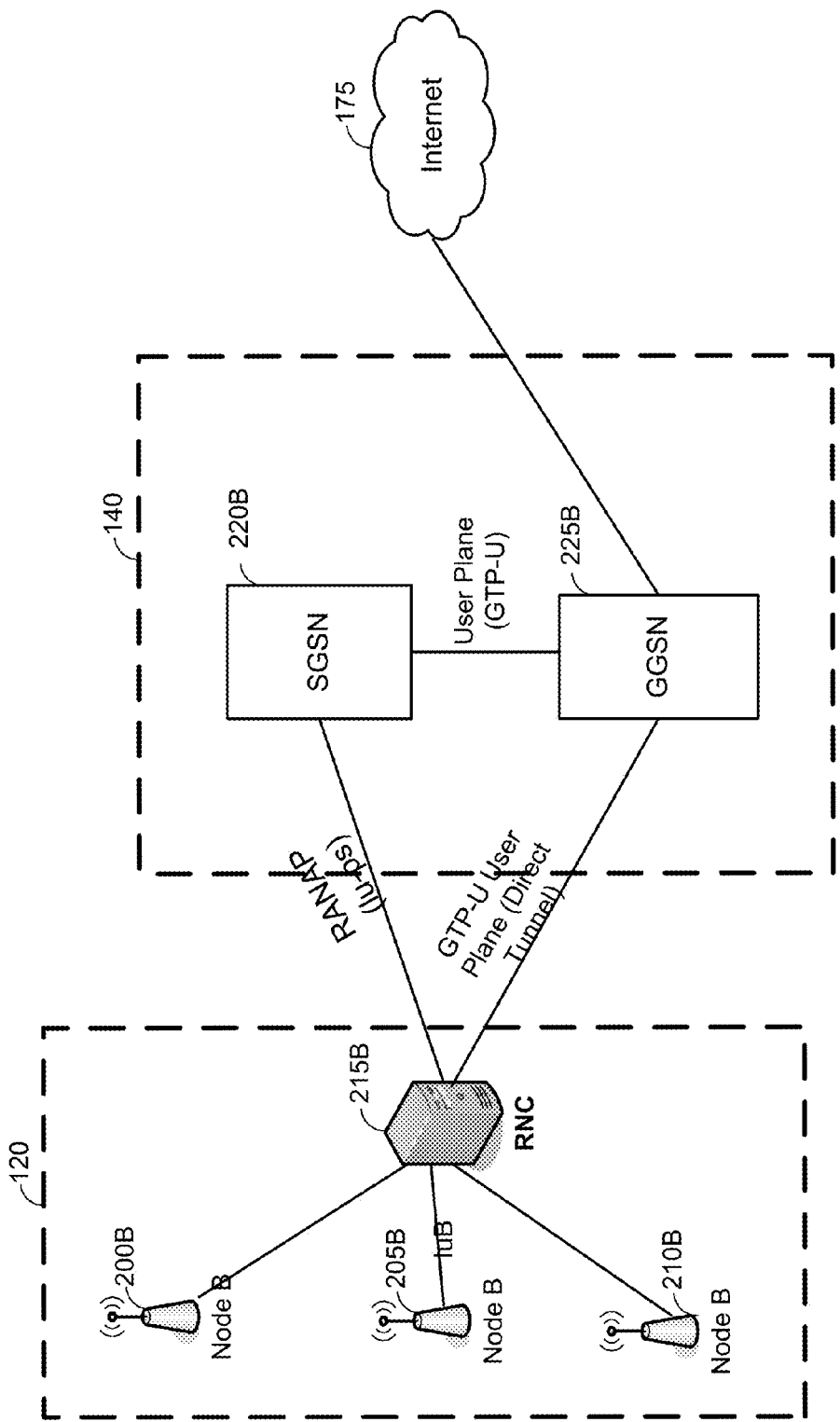
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
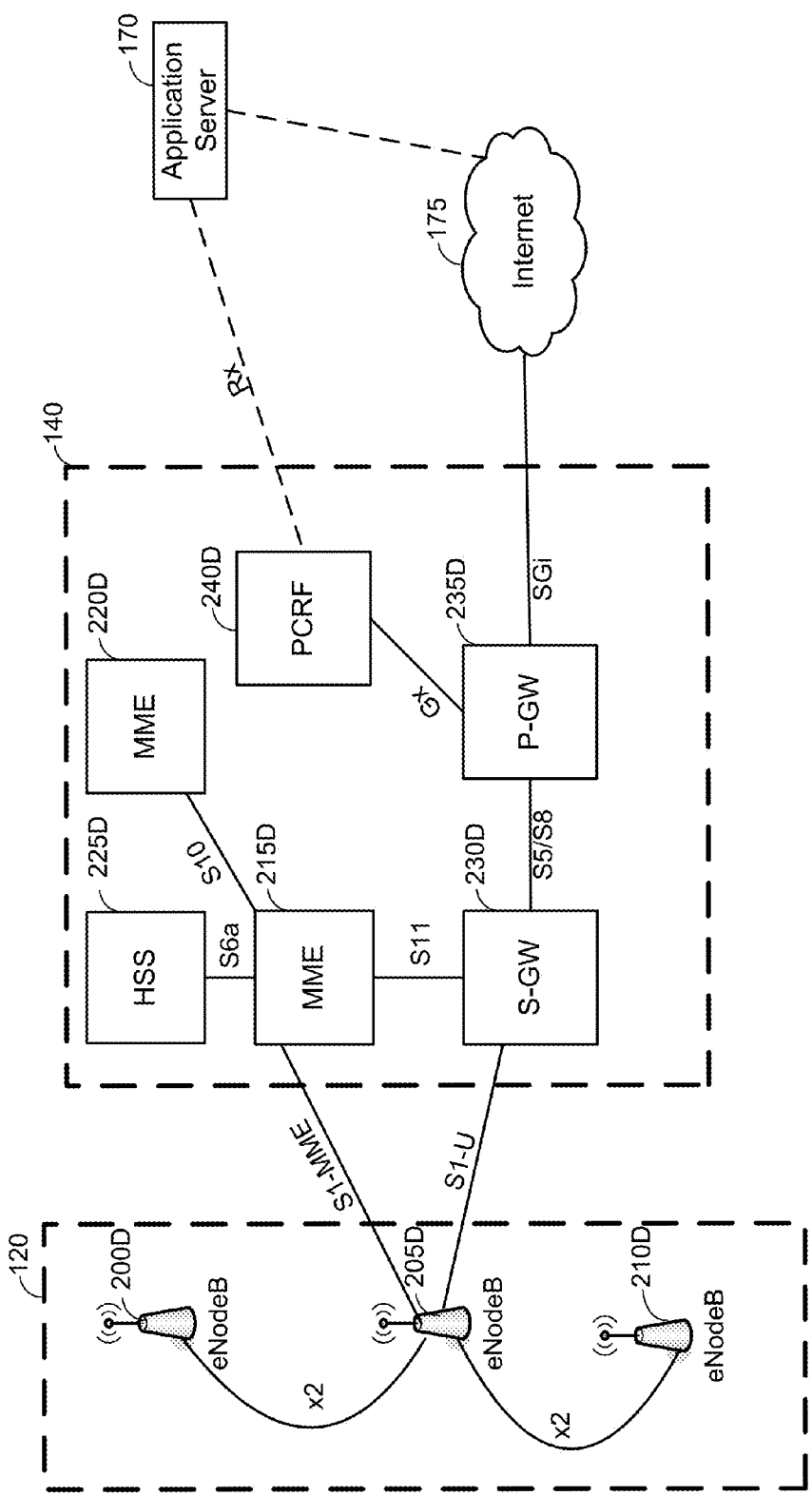
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
| --- | --- |
| S1-MME | Reference point for the control plane protocol between RAN 120 and MME 215D. |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

Figure 2E:
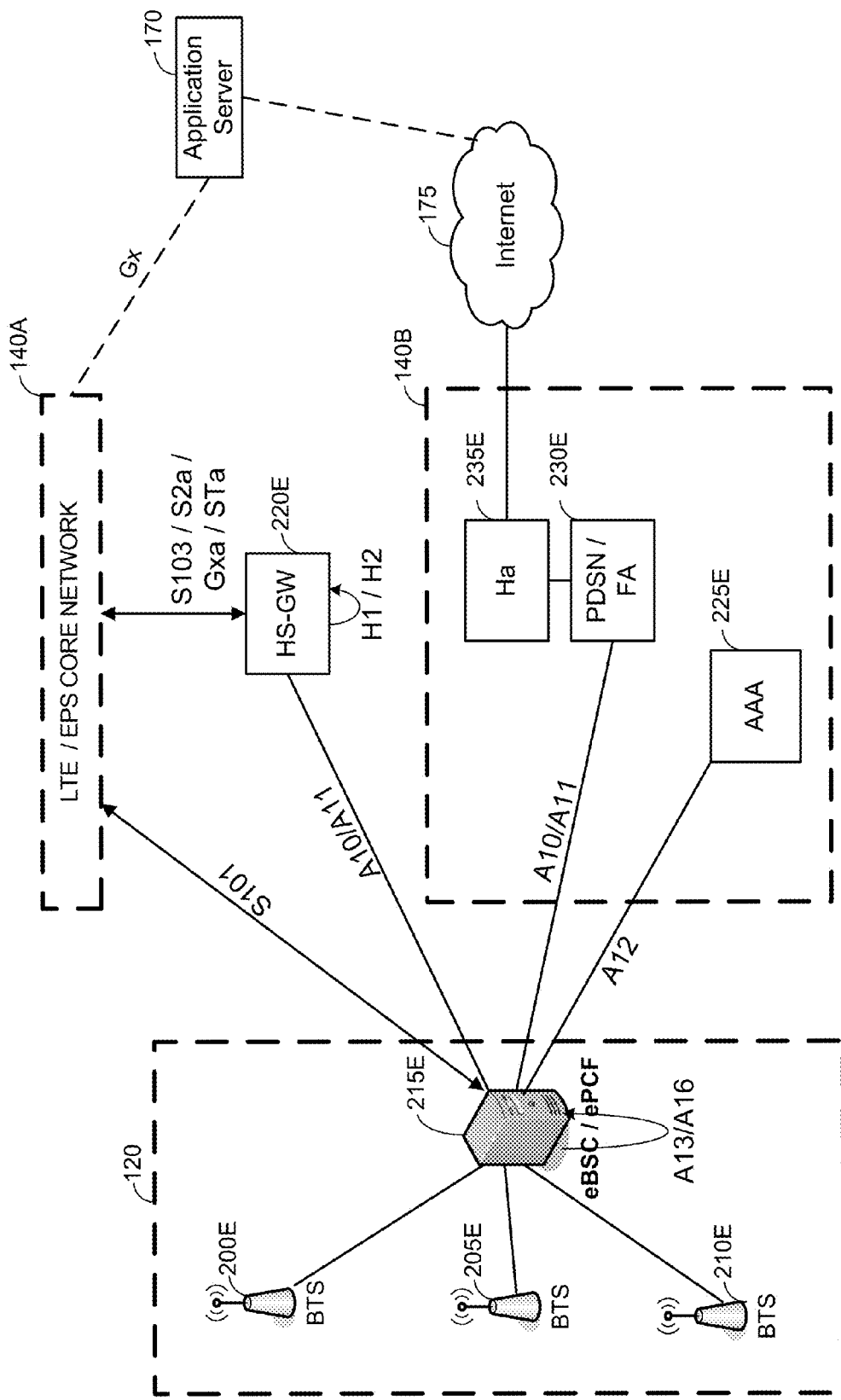
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
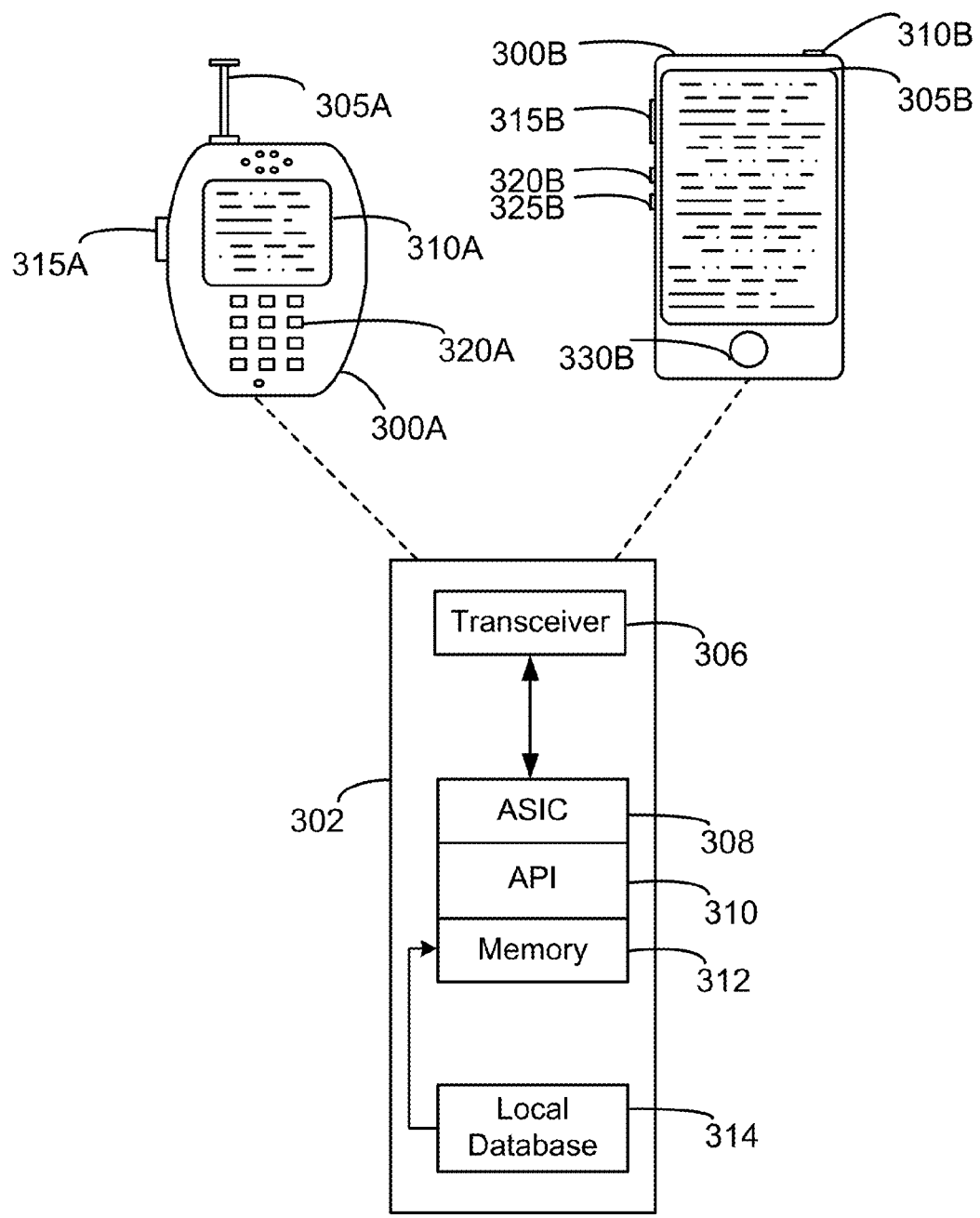
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
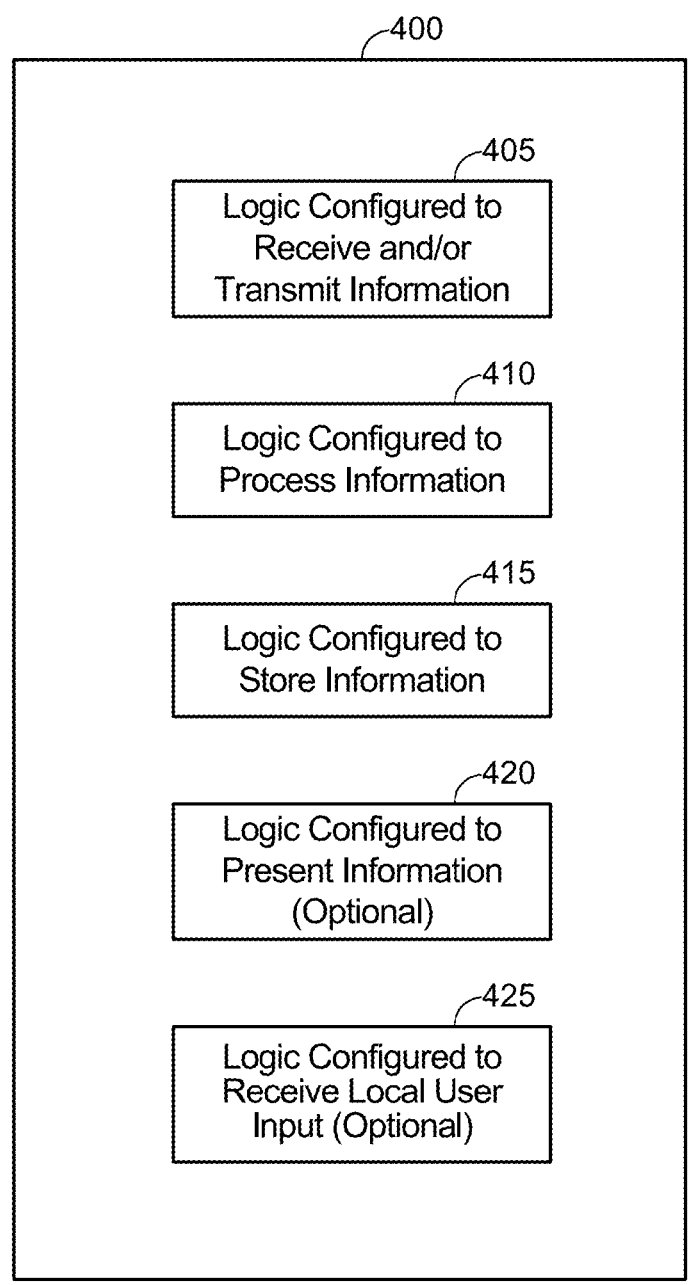
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
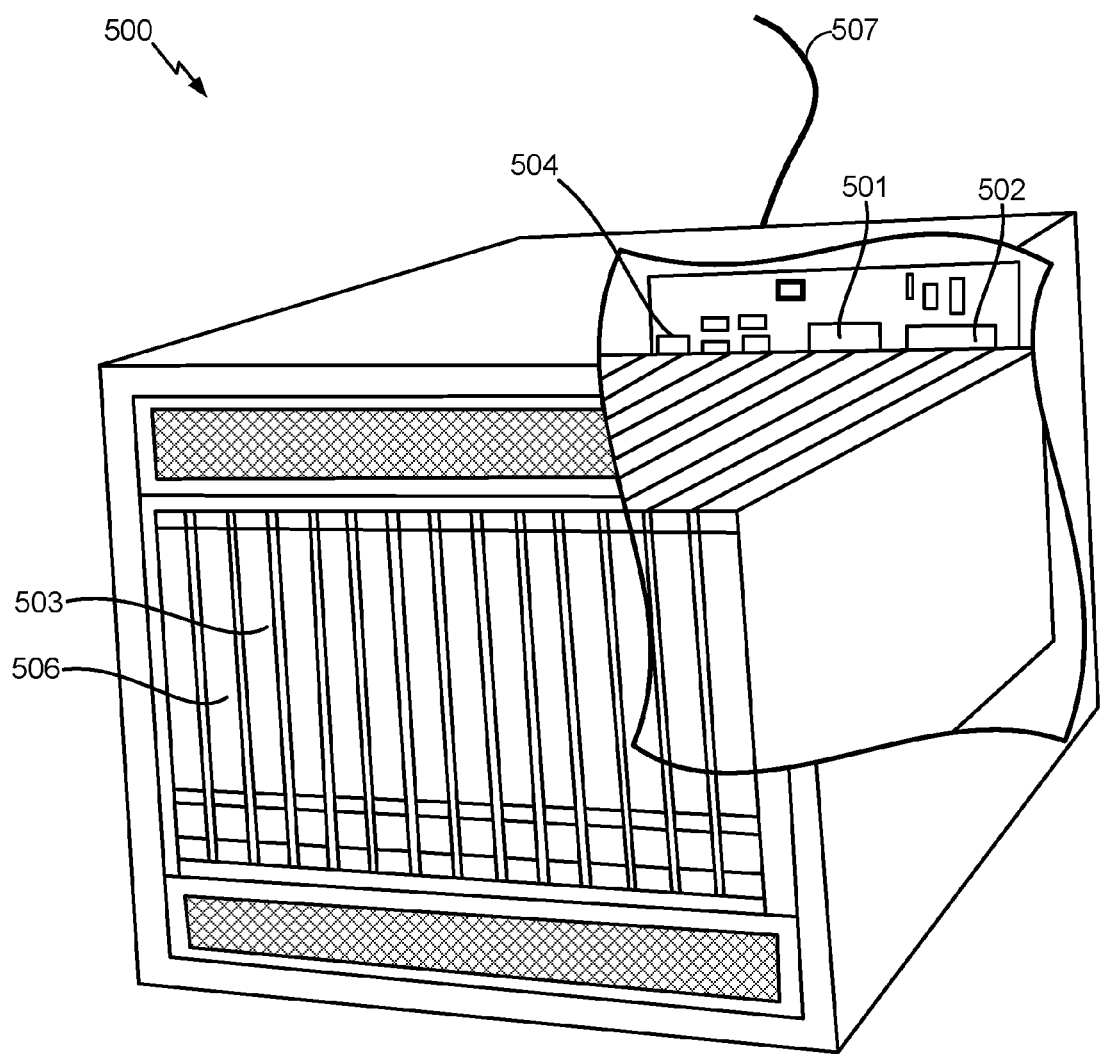
FIG. 5 illustrates a server in accordance with an embodiment of the invention.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 500 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access ports 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

Access networks using various communication protocols (e.g., 3GPP access networks such as W-CDMA, LTE, etc. as described above with respect to FIGS. 2A-2E, or non-3GPP access networks such as WiFi, WLAN or wired LAN, IEEE 802, IEEE 802.11, etc.) can be configured to provide Internet Protocol (IP) Multimedia Subsystem (IMS) services via an IMS network managed by an operator (e.g., Verizon, Sprint, AT&T, etc.) to users across a communications system. Users that access the IMS network to request an IMS service are assigned to one of a plurality of regional application servers or application server clusters (e.g., groups of application servers that serve the same cluster region) for supporting the requested IMS service.

Figure 6:
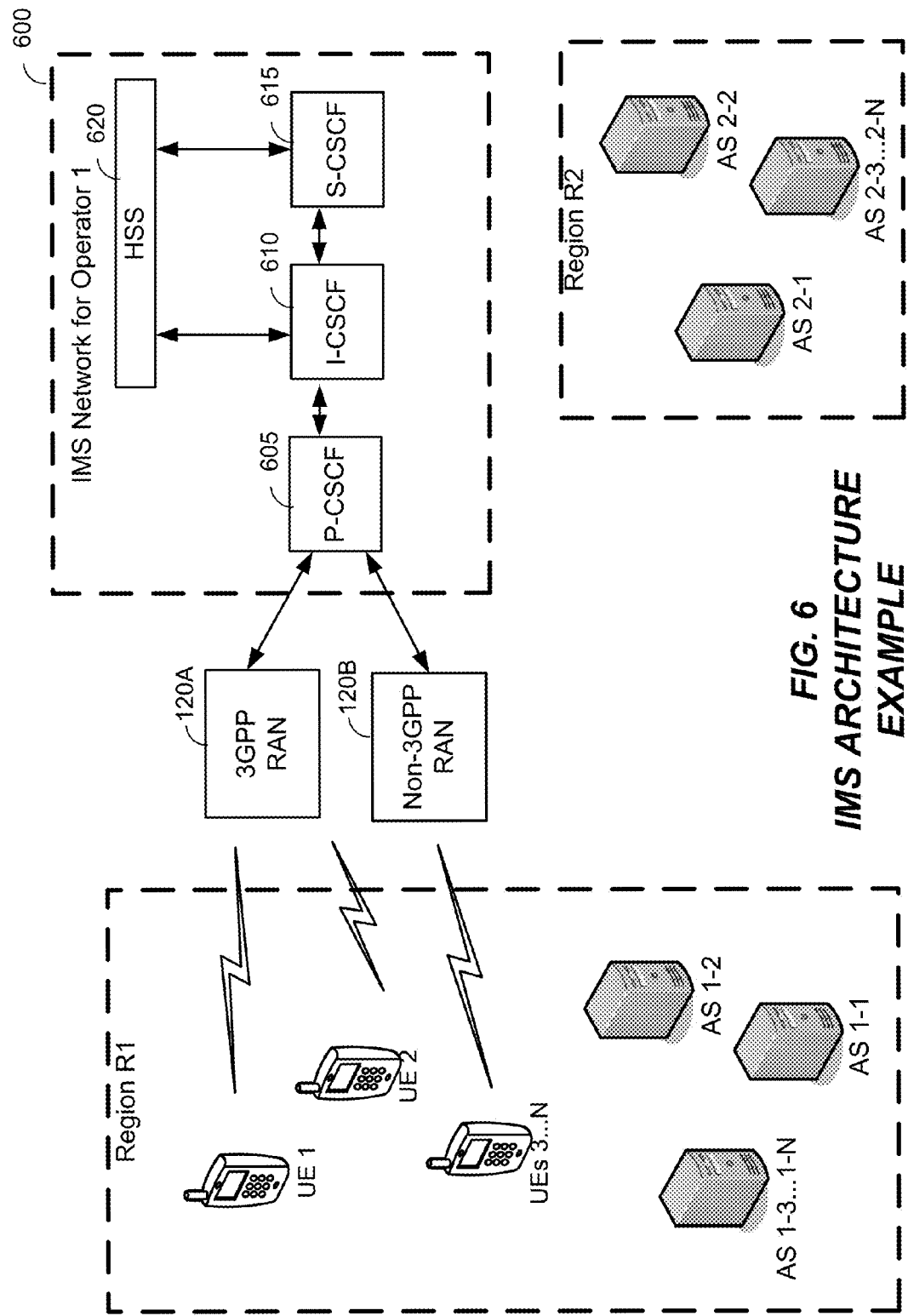
FIG. 6 illustrates an example of Internet Protocol (IP) multimedia subsystem (IMS) session architecture in accordance with an embodiment of the invention.

FIG. 6 illustrates an example of IMS architecture in accordance with an embodiment of the invention. Referring to FIG.

6, assume that a first cluster of application servers denoted as AS 1-1, AS 1-2 . . . AS 1-N is configured to provide IMS service to UEs and is located (or deployed) in a first region, and that a second cluster of application servers denoted as AS 2-1, AS 2-2 . . . AS 2-N is configured to provide IMS service to UEs is located (or deployed) in a second region. While not shown in FIG. 6 explicitly, other clusters of application servers can be deployed in other cluster regions as well. In FIG. 6, each cluster of application servers is assumed to be operated by the same operator (e.g., Sprint, Verizon, AT&T, etc.). In FIG. 6, UEs 1 . . . N are assumed to be operating in cluster region R1 and are configured to connect either to a 3GPP RAN 120A (e.g., any of RANs 120 from FIGS. 2A-2E) or a non-3GPP RAN 120B (e.g., a wired Ethernet connection, a WiFi connection such as AP 125, etc.). UEs 1 . . . N can then connect to an IMS network 600 through either the 3GPP RAN 120A or the non-3GPP RAN 120B.

Referring to FIG. 6, the IMS network 600 is shown as illustrating a particular set of IMS components, including a proxy call session control function (P-CSCF) 605, an interrogating CSCF (I-CSCF) 610, a serving CSCF (S-CSCF) 615 and a Home Subscriber Server (HSS) 620. The P-CSCF 605, I-CSCF 610 and S-CSCF 615 are sometimes referred to collectively as the CSCF, and the CSCF is responsible for signaling via Session Initiation Protocol (SIP) between the Transport Plane, Control Plane, and the Application Plane of the IMS network 600.

Referring to the P-CSCF 605 of FIG. 6, the P-CSCF 605 is responsible for interfacing directly with Transport Plane components and is the first point of signaling within the IMS network 600 for any end-point, such as UEs 1 . . . N. Once an endpoint acquires IP connectivity, the end point will cause a registration event to occur by first signaling to the P-CSCF 605. As the name implies, the P-CSCF 605 is a proxy for SIP messages from end-points to the rest of the IMS network 600. It is usually in a home network of the end point, but may reside in a visited network of the end point. The P-CSCF 605 will use a DNS look-up to identify a target I-CSCF 610 to send SIP messages, which could be an I-CSCF 610 in its own network or another I-CSCF across an administrative domain. The P-CSCF 605 can also be responsible for policy decisions (e.g., via an integrated or standalone Policy Decision Function (PDF) in Releases 5 or 6 of IMS, via a Policy Charging, and Resource Function (PCRF) in Release 7 of IMS, etc.).

Referring to the I-CSCF 610 of FIG. 6, the main function of the I-CSCF 610 is to proxy between the P-CSCF 605 as entry point and S-CSCF 615 as control point for applications found in the Applications Plane. When the P-CSCF 605 receives a registration request SIP message, it will perform a DNS look-up to discover the appropriate I-CSCF 610 to route the message. Once the I-CSCF 610 receives the SIP message, it will perform a look-up operation with the HSS 620 via Diameter to determine the S-CSCF 615 that is associated with the end-point terminal Once it receives this information, it will forward the SIP message to the appropriate S-CSCF 610 for further treatment.

Referring to the S-CSCF 615, the S-CSCF 615 is responsible for interfacing with the Application Servers (AS) (e.g., such as application servers 1-1, 1-2 . . . 1-N in cluster region R1, or application servers 2-1, 2-2 . . . 2-N in cluster region 2, and so on) in the Application Plane. Upon receiving a registration request SIP message from an I-CSCF 610, the S-CSCF 615 will query the HSS 622 via Diameter protocol to register the terminal as being currently served by itself. Subsequent session establishment requires knowing which S-CSCF 615 is responsible for the terminal session control. As part of the registration process, the S-CSCF 615 uses credentials it obtains from the query to the HSS 620 to issue an SIP message "challenge" back to the initiating P-CSCF 605 to authenticate the terminal.

In addition to acting as a registrar, the S-CSCF 615 is also responsible for routing SIP messages to the AS allowing for the Control Plane session control to interact with the Application Plane application logic. To do this, the S-CSCF 615 uses information obtained from the HSS 620 in the form of Initial Filter Criteria (IFC) that acts as triggers against inbound session establishment requests. The IFC includes rules that define how and where SIP messages should be routed to the various application servers that may reside in the Application Plane. The S-CSCF 615 may also act on Secondary Filter Criteria (SFC) obtained from the application servers during the course of messaging with them.

Referring to FIG. 6, a UE that requests IMS service (e.g., registration to set-up or join a VoIP session, a PTT session, a group communication session, etc.) from the IMS network 600 is assigned (or registered) to a target application server that is selected by the S-CSCF 615, as noted above. Generally, the IMS network 600 will attempt to select, as the target application server, an application server that is physically close to the UE and is also known to be capable of providing the requested IMS service.

Rich Communications Suite (RCS) is a recently developed service-type in the IMS domain. RCS permits users to query device capabilities and/or application-level multimedia capabilities from their contacts, such that a client device can update the capabilities of the contacts in its address book in real-time and thus enable "rich communication", such as Voice over LTE (VoLTE), video calls, Instant Messaging (IM), file or image sharing, etc., based on the real-time capabilities of the contacts. In the current RCS standard, UEs send a UE-to-UE (or peer-to-peer) SIP OPTIONS message to one or more target UEs to request the UE-specific RCS capabilities of the target UEs. The SIP OPTIONS message includes the RCS capabilities of the transmitting UE, and the SIP OPTIONS message prompts the target UE to respond to the SIP OPTIONS message with a SIP 200 OK message that indicates the RCS capabilities of the target UE. Thus, the exchange of the SIP OPTIONS and SIP 200 OK messages is a peer-to-peer handshaking process that is mediated by the IMS network and by which both endpoints update their respective RCS capabilities for the other endpoint.

For example, UE 1 can send a SIP OPTIONS message to UE 2 over an IMS network that indicates UE 1's RCS capabilities and requests UE 2 to respond back to UE 1 with an indication of the RCS capabilities of UE 2, UE 1 can send a SIP OPTIONS message to UE 3 over the IMS network that indicates UE 1's RCS capabilities and requests UE 3 to respond back to UE 1 with an indication of the RCS capabilities of UE 3, and so on. UE 2 then responds to the SIP OPTIONS message from UE 1 with a SIP 200 OK message that indicates UE 2's RCS capabilities, UE 3 responds to the SIP OPTIONS message from UE 1 with a SIP 200 OK message that indicates UE 3's RCS capabilities, and so on.

As will be appreciated, in the current RCS standard, the overall messaging associated with RCS capability discovery scales linearly with the number of UEs for which RCS capability information is requested. In the example from above, if UE 1 desires to update the RCS capability for a high number of target UEs, this will in turn cause a relatively high amount of traffic between UE 1 and the target UEs.

FIG. 7 illustrates a conventional process of discovering RCS capabilities for a group of contacts. Referring to FIG. 7, assume that UE 1 is associated with a first user. UE 1 registers with the IMS network 600 for RCS service, 700. The registration at 700 can correspond to an initial registration for RCS service with the IMS network for any of the first user's UEs, or alternatively can correspond to an initial registration for RCS service with the IMS network by UE 1 whereby the first user is already associated with one or more other UEs that have previously registered for RCS service with the IMS network.

After performing the registration at 700, UE 1 determines to retrieve RCS capability information for each RCS contact in the first user's contact book, 705. The RCS contacts in the first user's contact book can correspond to all of the first user's contacts in the contact book, or a subset thereof. For example, when UE 1 boots for the first time, it generally does not know RCS capabilities for each of its contacts. Thereby, an 'initial' RCS capability discovery procedure is performed to all of its contacts. Over time, UE 1 can query RCS capabilities more selectively so that contacts that never report any RCS capability are excluded after a threshold number of inquiries. Thus, if the registration of 700 is an 'initial' registration after an initial boot of UE 1, the determination at 705 can include all of the contacts in the first user's contact book, and if the registration of 700 is a later registration, UE 1 has the option of identifying a subset of its contacts as RCS contacts. For convenience of explanation, assume that the RCS contacts in the first user's contact book map to UEs 2 . . . 5, each of which is operated by a different user from the first user. UEs 2 . . . 5 can each be associated with different users, or alternatively two or more of UEs 2 . . . 5 may be associated with the same user from the first user's contact book (e.g., UE 2 may be a cell phone of a second user while UE 3 may be an iPad of the second user, where both cell phone and iPad contact information is stored for the second user in the contact book of the first user on UE 1).

At this point, UE 1 successively queries UEs 2 . . . N for their respective RCS capability information. At 710, UE 1 transmits a SIP OPTIONS message that indicates UE 1's RCS capabilities to UE 2 via the IMS network 600, and UE 2 responds to the SIP OPTIONS message from 710 with a SIP 200 OK message that indicates the RCS capabilities for UE 2, 715. At 720, UE 1 transmits a SIP OPTIONS message that indicates UE 1's RCS capabilities to UE 3 via the IMS network 600, and UE 3 responds to the SIP OPTIONS message from 720 with a SIP 200 OK message that indicates the RCS capabilities for UE 3, 725. At 730, UE 1 transmits a SIP OPTIONS message that indicates UE 1's RCS capabilities to UE 4 via the IMS network 600, and UE 4 responds to the SIP OPTIONS message from 730 with a SIP 200 OK message that indicates the RCS capabilities for UE 4, 735. At 740, UE 1 transmits a SIP OPTIONS message that indicates UE 1's RCS capabilities to UE 5 via the IMS network 600, and UE 5 responds to the SIP OPTIONS message from 740 with a SIP 200 OK message that indicates the RCS capabilities for UE , 745.

The RCS capability discovery procedure shown in FIG. 7 is described as triggered by RCS service registration at 700 (e.g., an initial user registration for RCS service or a new device registration for RCS service). However, the RCS capability discovery procedure can also be triggered in other scenarios, such as (i) when a new RCS contact is added to the first user's contact book on UE 1, (ii) on a periodic basis to refresh the RCS capability information of the first user's RCS contacts on UE 1 and/or (iii) when details associated with one or more of the first user's RCS contacts are edited (e.g., phone number, SIP URI, etc.).

Embodiments of the invention are directed to an RCS capability discovery procedure whereby RCS capability information for multiple target UEs is retrieved by a requesting UE from a single target UE. As will be described below in more detail, by modifying the SIP OPTIONS and SIP 200 OK messages exchanged between two UEs engaged in an RCS capabilities exchange procedure, RCS capability information for two or more UEs can be conveyed via a single SIP 200 OK message.

FIG. 8 is directed to an RCS capability discovery procedure in accordance with an embodiment of the present invention. Referring to FIG. 8, assume that UEs 2 and 3 are each aware of their own RCS capability information and that UEs 2 and 3 have previously acquired RCS capability information for UEs 4 and 5 (e.g., during a previous SIP OPTIONS/200 OK handshaking procedure or from some other UE via a process similar to the process described below at UE 1 with respect to FIG. 8), 800 and 805. However, further assume that the ages of the RCS capability information maintained by UEs 2 and 3 for UE 4 are different, with the RCS capability information maintained on UE 2 for UE 4 being older than the RCS capability information maintained on UE 3 for UE 4. In an example, this condition can occur based on UE 3 having more recently refreshed the RCS capability information of UE 4 as compared with UE 2. In the embodiment of FIG. 8, because UEs 2 and 3 are aware of the RCS capability information for UEs 4 and 5, it is likely that UEs 4 and 5 are also aware of the RCS capability information for UEs 2 and 3. Accordingly, assume that UEs 4 and 5 are each aware of their own RCS capability information and that UEs 4 and 5 have previously acquired RCS capability information for UEs 2 and 3, 810 and 815. Table 2 below represents an example of the RCS capability information that can be maintained at UEs 2 . . . 5 between 800-815:

TABLE 2

| | Current Time = 11:30:00 PM | | | |
|---|---|---|---|---|
| Device | Information for UE 2 | Information for UE 3 | Information for UE 4 | Information for UE 5 |
| UE 2 | T = Current RCS CI: (1) Image Share Capable (2) Voice Call Capable (3) Instant Message Capable (4) Video Share Capable | N/A | T = 9:32:00 PM RCS CI: (1) Image Share Capable | T = 11:23:00 PM RCS CI: (1) Image Share Capable (2) Voice Call Capable |
| UE 3 | N/A | T = Current RCS CI: (1) Image Share Capable (2) Voice Call Capable | T = 11:17:00 PM RCS CI: (1) Image Share Capable (2) Voice Call Capable (3) Instant Message Capable | T = 11:15:00 PM RCS CI: (1) Image Share Capable (2) Voice Call Capable |
| UE 4 | T = 11:11:00 PM RCS CI: (1) Image Share Capable (2) Voice Call Capable (3) Instant Message Capable (4) Video Share Capable | T = 10:59:00 PM RCS CI: (1) Image Share Capable (2) Voice Call Capable | T = Current RCS CI: (1) Image Share Capable (2) Voice Call Capable (3) Instant Message Capable | N/A |

TABLE 2-continued

Current Time = 11:30:00 PM

| Device | Information for UE 2 | Information for UE 3 | Information for UE 4 | Information for UE 5 |
|---|---|---|---|---|
| UE 5 | T = 11:11:00 PM RCS CI: (1) Image Share Capable (2) Voice Call Capable (3) Instant Message Capable (4) Video Share Capable | T = 10:59:00 PM RCS CI: (1) Image Share Capable (2) Voice Call Capable | N/A | T = Current RCS CI: (1) Image Share Capable (2) Voice Call Capable |

As shown in Table 2 (above), the particular RCS capability information and associated age (or timestamp, denoted "T" in Table 2) is provided, with the timestamp ("T") of each UE's own RCS capability information labeled as "Current". The timestamp ("T") can be indicative of the time at which the relevant UE transmitted the RCS capability information to some other UE (either the UE that maintains the RCS capability information or some other intervening UE), or an earlier point in time prior to the actual transmission when the RCS capability information was validated by the relevant UE.

Referring to FIG. 8, assume that UE 1 is associated with a first user. At some point after registering with the IMS network 600 for RCS service, UE 1 determines to retrieve RCS capability information for two or more RCS contacts in the first user's contact book, 820. The determination of 820 can be triggered by (i) an initial user registration for RCS service, (ii) a new device registration for RCS service, (iii) a new RCS contact being added to the first user's contact book on UE 1, (iv) reaching a next periodic interval at which refreshes of the RCS capability information of the first user's RCS contacts on UE 1 are triggered and/or (iii) edits to details associated with one or more of the first user's RCS contacts (e.g., phone number, SIP URI, etc.).

As in FIG. 7, the RCS contacts in the first user's contact book can correspond to all of the first user's contacts in the contact book, or a subset thereof. In an example, similar to 705 of FIG. 7, UE 1 may determine to retrieve (or refresh) the RCS capability information for each of the RCS contacts in the first user's contact book at 820. Alternatively, UE 1 may determine to attempt to retrieve or refresh the RCS capability information for a subset (e.g., less than all) of the RCS contacts in the first user's contact book at 820. For convenience of explanation, assume that the two or more RCS contacts for which an RCS capability information update is determined at 820 map to UEs 2 . . . 5, each of which is operated by a different user from the first user. UEs 2 . . . 5 can each be associated with different users, or alternatively two or more of UEs 2 . . . 5 may be associated with the same user from the first user's contact book (e.g., UE 2 may be a cell phone of a second user while UE 3 may be an iPad of the second user, where both cell phone and iPad contact information is stored for the second user in the contact book of the first user on UE 1).

After identifying UEs 2 . . . 5 as the RCS contacts for which to retrieve or update RCS capability information at 820, UE 1 can optionally evaluate the respective priorities of UEs 2 . . . 5 to determine an update order by which UE 1 will attempt to retrieve RCS capability information therefrom, 825. For example, a first RCS contact corresponding to the first user's wife may be allocated a higher priority than a second RCS contact corresponding to the first user's co-worker. Further, multiple UEs can be associated with the same RCS contact, and the different UEs associated with the same contact can also be allocated different priorities. For example, a cell phone operated by the first user's wife may be allocated a higher priority than an iPad operated by the first user's wife because the first user's wife may be presumed to carry her cell phone with her at all times. Table 3 (below) illustrates an example set of priorities associated with UE 1 for UEs 2 . . . 5:

TABLE 3

| Device | Priority |
|---|---|
| UE 2 | High Priority (e.g., wife's cell phone) |
| UE 3 | Intermediate Priority (e.g., wife's iPad) |
| UE 4 | Intermediate Priority (e.g., brother's cell phone) |
| UE 5 | Low Priority (e.g., co-worker's computer) |

The priorities shown in Table 3 are determined based on a relationship status (e.g., wife, husband, co-worker, family member, friend) with the first user that can be user-specified (or ascertained via a social network) and can be used to infer the relative priorities of the UEs. However, the priorities can be determined in a number of alternative ways aside from relationship status. For example, the priorities of the UEs can be determined based on how frequently UE 1 interacts with the other UEs (e.g., higher interaction frequency can be associated with higher priority). In another example, factors such as time of day and/or location can be used to affect the priorities. For example, if UE 2 is operated by a friend of the first user who lives in San Diego, detection of UE 1 being located near San Diego can increase UE 2's priority because it is more likely that UE 1 is going to try to contact UE 2 when their respective users are near each other, which can augment UE 2's priority while UE 1 is local to UE 2. In another example, if UE 3 is operated by a co-worker of UE 1, UE 3's priority can be higher during normal work hours when communication between UE 1 and UE 3 is more likely as compared to at other times. The above-noted priority factors can be used in isolation or in combination to arrive at the resultant priorities for the respective UEs for a particular RCS capability information discovery procedure. Thus, the priorities are not necessarily static, and can change based on circumstance.

Irrespective of whether UEs 2 . . . 5 are ranked by priority or are ordered by some type of default ordering mechanism, assume that UE 1 determines to send SIP OPTION messages to UEs 2 . . . 5 in order of UE 2, then UE 3 (if necessary), then UE 4 (if necessary), then UE 5 (if necessary). At 830, UE 1 configures a SIP OPTIONS message for delivery to UE 2 that not only indicates UE 1's RCS capability information, but also identifies each of UEs 3 . . . 5. The manner in which the SIP OPTIONS message is configured to identify UEs 3 . . . 5 can be implemented in a number of different ways. For example, phone numbers and/or SIP Uniform Resource Identifiers (URIs) for UEs 3 . . . 5 can be attached to the SIP OPTIONS message either in a new proprietary field or a field that is already defined by the RCS standard, such as a SIP OPTIONS BLOB field. Alternatively, instead of including the entire phone numbers and/or URIs for UEs 3 . . . 5, UE 1 can instead configure the SIP OPTIONS message to include a hash (e.g., an MD5 hash) of the phone numbers and/or URIs.

After configuring the SIP OPTIONS message at 830, UE 1 transmits the configured SIP OPTIONS message that indicates UE 1's RCS capabilities and also identifies UEs 3 . . . 5 to UE 2 via the IMS network 600, 835. UE 2 receives the configured SIP OPTIONS message and generates a SIP 200 OK message that indicates the RCS capability information for UE 2, 840. However, in the embodiment of FIG. 8, UE 2 also compares the identification information for UEs 3, 4 and 5 against UE 2's own contact book to determine if any matches occur. If there are one or more matches and UE 2 maintains RCS capability information for the matching contact(s), UE 2 adds the RCS capability information for the matching contact(s) into the SIP 200 OK message at 840. In this case, as shown in Table 2 (above), the SIP OPTIONS message from 835 identifies UEs 4 and 5 and UE 2 maintains RCS capability information for UEs 4 and 5, so UE 2 attaches the RCS capability information for UEs 4 and 5 to the SIP 200 OK message at 840. UE 2 then transmits the configured SIP 200 OK message that indicates the RCS capabilities of UEs 2, 4 and 5 to UE 1 via the IMS network 600, 845.

At this point, assume that five seconds have passed from the RCS capability information state shown in Table 2 (above), such that the RCS capability information that is known to UE 1 (aside from its own RCS capability information) is shown in Table 4 (below), as follows:

TABLE 4

| | | Current Time = 11:30:05 PM | | |
|---|---|---|---|---|
| Device | Information for UE 2 | Information for UE 3 | Information for UE 4 | Information for UE 5 |
| UE 1 | T = 11:30:00 PM RCS CI: (1) Image Share Capable (2) Voice Call Capable (3) Instant Message Capable (4) Video Share Capable | N/A | T = 9:32:00 PM RCS CI: (1) Image Share Capable | T = 11:23:00 PM RCS CI: (1) Image Share Capable (2) Voice Call Capable |

Based on the assumptions shown in Table 4 (above), UE 1 has successfully acquired RCS capability information for UEs 2 and 5 from the SIP 200 OK message received from UE 2 at 845. However, UE 2 did not provide the RCS capability information for UE 3. Also, in the embodiment of FIG. 8, assume that an RCS expiration threshold corresponds to 60 minutes, such that any RCS capability information that is older than 60 minutes is deemed to have expired. With this assumption, the RCS capability information for UE 4 is expired because it is nearly two hours old when received by UE 2. The RCS expiration threshold can either be static (e.g., 60 minutes, etc.), or can be dynamic based on priority or some other factor, as will be described below with respect to the RCS capability information age threshold at 910 of FIG. 9 below. The RCS capability information age threshold described with respect to 910 of FIG. 9 below may thereby be the same or different from the RCS expiration threshold used to determine whether RCS capability information is expired by UE 1 during the process of FIG. 8. At 850, UE 1 determines to continue the RCS capability discovery procedure by pinging UE 3 because UE 3 is the next UE after UE 2 in the order determined at 825 based on priority (or based on some default ordering scheme).

At 855, UE 1 configures a SIP OPTIONS message for delivery to UE 3 that not only indicates UE 1's RCS capability information, but also identifies each of UEs 2, 4 and 5. As an alternative, because UE 1's RCS capability information for UE 2 is so recent, UE 2 can potentially be omitted from the SIP OPTIONS message at 855. Similar to 830, the manner in which the SIP OPTIONS message is configured to identify UEs 2, 4 and 5 can be implemented in a number of different ways (e.g., attaching phone numbers and/or URIs or a hash thereof of UEs 2, 4 and 5 to a SIP OPTIONS BLOB field, using a new proprietary field of the SIP OPTIONS message, etc.)

After configuring the SIP OPTIONS message at 855, UE 1 transmits the configured SIP OPTIONS message that indicates UE 1's RCS capabilities and also identifies UEs 2, 4 and 5 to UE 3 via the IMS network 600, 860. UE 3 receives the configured SIP OPTIONS message and generates a SIP 200 OK message that indicates the RCS capability information for UE 3, 865. However, in the embodiment of FIG. 8, UE 3 also compares the identification information for UEs 2, 4 and 5 against UE 3's own contact book to determine if any matches occur. If there are one or more matches and UE 3 maintains RCS capability information for the matching contact(s), UE 3 adds the RCS capability information for the matching contact(s) into the SIP 200 OK message at 865. In this case, as shown in Table 2 (above), the SIP OPTIONS message from 860 identifies UEs 4 and 5 and UE 3 maintains RCS capability information for UEs 4 and 5, so UE 3 attaches the RCS capability information for UEs 4 and 5 to the SIP 200 OK message at 865. UE 3 then transmits the configured SIP 200 OK message that indicates the RCS capabilities of UEs 3, 4 and 5 to UE 1 via the IMS network 600, 870.

At this point, assume that five more seconds have passed from the RCS capability information state shown in Table 4 (above), such that the RCS capability information that is known to UE 1 (aside from its own RCS capability information) is shown in Table 5 (below), as follows:

TABLE 5

| | | Current Time = 11:30:10 PM | | |
|---|---|---|---|---|
| Device | Information for UE 2 | Information for UE 3 | Information for UE 4 | Information for UE 5 |
| UE 1 | T = 11:30:00 PM RCS CI: (1) Image Share Capable (2) Voice Call Capable (3) Instant Message Capable (4) Video Share Capable | T = 11:30:05 PM RCS CI: (1) Image Share Capable (2) Voice Call Capable | T = 11:17:00 PM RCS CI: (1) Image Share Capable (2) Voice Call Capable (3) Instant Message Capable | T = 11:23:00 PM RCS CI: (1) Image Share Capable (2) Voice Call Capable |

Based on the assumptions shown in Table 5 (above), UE 1 updates its RCS capability information state for UEs 2 . . . 5, 875. In particular, as shown in Table 5, UE 1 has successfully acquired RCS capability information for each of UEs 2 . . . 5 from the SIP 200 OK message received from UE 2 at 845 in combination with the SIP 200 OK message received from UE 3 at 870. In particular, for UE 2, UE 1's RCS capability information state uses the RCS capability information reported by UE 2 in the SIP 200 OK message at 840 because it is more recent than the RCS capability information reported by UE 3 for UE 2 in the SIP OPTIONS message of 870. Further, for UE 3, UE 1's RCS capability information state uses the RCS capability information reported by UE 3 in the SIP 200 OK message at 870 because the RCS capability information reported by UE 2 in the SIP OPTIONS message of 870 did not include any RCS capability information for UE 3. Further, for UE 4, UE 1's RCS capability information state uses the RCS capability information reported by UE 3 in the SIP 200 OK message at 870 because it is more recent than the expired RCS capability information reported by UE 2 for UE 4 in the SIP OPTIONS message of 840. Further, for UE 5, UE 1's RCS capability information state uses the RCS capability information reported by UE 2 in the SIP 200 OK message at 840 because it is more recent than the RCS capability information reported by UE 3 for UE 5 in the SIP OPTIONS message of 870.

While not shown explicitly in FIG. 8, one or more of the RCS contacts (or UEs) may place limits on whether their respective RCS capability information is permitted to be shared with third party UEs. For example, a particular user may permit his/her RCS capability information for one of his/her device to be shared with close family members, but not with friends or co-workers. In this case, UE 2 may be required to obtain permission to add UE 5's RCS capability information to the SIP 200 OK message at 840 for example. Such permission can be obtained in advance (e.g., UE 5 provides UE 2 with an authorized buddy list of RCS contacts to which UE 2 may provide UE 5's RCS capability information) or in real-time (e.g., UE 2 pings UE 5 for permission to provide UE 1 with UE 5's RCS capability information after the SIP OPTIONS message arrives from UE 1 at 835). Alternatively, UE 5 can simply ask UE 2 not to disclose its RCS capability information to any requesting entity. Thereby, an authorization aspect can be made part of the process of FIG. 8 in other embodiments of the invention that permits users to control which UEs gain access to their RCS capability information.

Further, while not shown explicitly in FIG. 8, if UE 1 determines to contact less than all of its RCS contacts at 820, UE 1 still has the option of identifying its full list of RCS contacts in the SIP OPTIONS message at 835 and/or 855. For example, assume that UE 1's contact book includes at least UEs 2 . . . 6. In this example, if UEs 2 . . . 5 are selected at 820 based on UE 1 having expired (or non-existent) RCS capability information for UEs 2 . . . 5 and UE 1 does not select UE 6 at 820 because UE 6's RCS capability information is still fresh, UE 1 has the option of including UE 6's identifying information in the SIP OPTIONS message at 835 and/or 860 as a preemptive refresh mechanism for UE 6, even though UE 6 is not queued to receive an actual SIP OPTIONS message itself (i.e., directly from UE 1) during the process of FIG. 8. In other words, UE 1 will refresh UE 6's RCS capability information if possible, but will not seek out UE 6 directly as a target for a SIP OPTIONS message if the process of FIG. 8 does not result in an RCS capability information refresh for UE 6.

Further, while not shown explicitly in FIG. 8, in another embodiment UE 1 can configure SIP OPTIONS messages to include RCS capability information for one or more other UEs, similar to the SIP 200 OK message. For instance, the SIP 200 OK message received at 845 includes RCS capability for UE 2, UE 4 (expired) and UE 5. Later, in addition to requesting the RCS capability information for UEs 2 . . . 5 from UE 3 via the SIP OPTIONS message of 860, UE 1 can also attach the RCS capability information that it already knows about to the SIP OPTIONS message of 860 (e.g., in the SIP OPTIONS BLOB field with the identifying information for UEs 2, 4 and 5, within a new proprietary field, etc.). UE 1 can also optionally exclude the RCS capability information for UE 4 due to its expiration. Thus, the exchange of RCS capability information for multiple UEs (as opposed to merely the transmitting UE) can be carried over to the SIP OPTIONS message in addition to the SIP 200 OK message in another embodiment.

FIG. 9 illustrates a process by which a given UE determines whether to refresh the RCS capability information for a target UE based on a priority of the target UE in accordance with an embodiment of the invention. Referring to FIG. 9, a given UE obtains RCS capability information that is associated with a target UE, whereby the RCS capability information includes a timestamp indicative of when the RCS capability information was reported (or validated) by the target UE, 900. In other words, the timestamp can be the time at which the target UE transmitted the RCS capability information to some other UE (either the UE that maintains the RCS capability information or some other intervening UE), or an earlier point in time prior to the actual transmission when the RCS capability information was validated by the target UE. As shown above with respect to FIG. 8, if UE 5 reports its RCS capability information to UE 2 and UE 2 subsequently reports UE 5's RCS capability information to UE 1, the timestamp tracked at UE 1 for UE 5's RCS capability information would correspond to the time at which UE 5 reported its RCS capability information to UE 2 (i.e., not the time at which UE 2 merely forwarded this data to UE 1).

Referring to FIG. 9, the given UE determines a priority level for the target UE, 905. For example, the priority level for the target UE can be determined as described above with respect to Table 3 (e.g., the target UE can have a high priority if the target UE is operated by a co-worker during work hours, a wife of an operator of the given UE, if the given UE and the target UE are nearby or have a history of communicating at a particular time block, etc.). Based on the priority determined at 905, the given UE identifies a priority-specific RCS capability information age threshold, 910. The RCS capability information age threshold determines how long the RCS capability information for the target UE is permitted to age before an RCS capability information refresh procedure for the target UE is triggered. As will be appreciated, a higher priority for the target UE is associated with a shorter RCS capability information age threshold so that the RCS capability information for higher priority RCS contacts is maintained 'fresher' than lower priority RCS contacts. For example, if the target UE has a low priority, the RCS capability information age threshold may be 90 minutes, if the target UE has an intermediate priority, the RCS capability information age threshold may be 60 minutes, and if the target UE has a high priority, the RCS capability information age threshold may be 30 minutes. As noted above, the RCS capability information age threshold may be the same or different than the RCS expiration threshold described above with respect to FIG. 8.

At 915, the given UE starts or resets a timer to track whether the RCS capability information is expired based on the RCS capability information age threshold identified at 910 along with the timestamp for the RCS capability information obtained at 900. As noted above, the 'age' of the RCS capability information is derived from the time at which the RCS capability information was reported by the target UE itself, and not necessarily by the time at which some intervening UE that conveyed the target UE's RCS capability information to the given UE. At 920, before the timer expires, the given UE determines whether fresher RCS capability information for the target UE has been received at the given UE, 920. If so, the process returns to 915 and the timer is reset (or extended) based on the timestamp associated with the newly arriving RCS capability information. If not, the given UE determines whether the timer is expired at 925. In particular, expiration of the timer at 925 is deemed to occur when the time between a current time and the timestamp of the most-recent RCS capability information received at the given UE for the target UE exceeds the RCS capability information age threshold identified for the target UE at 910.

Referring to FIG. 9, if the timer is determined not to have expired at 925, the process returns to 920 and continues to run. Otherwise, if the timer expires at 925, the given UE transmits a SIP OPTIONS message to the target UE that indicates the given UE's RCS capability information, 930. The SIP OPTIONS message transmitted at 930 can optionally be configured to further include identifiers for one or more other RCS contacts (aside from the target UE) so that the given UE can try to update the RCS capability information for the other RCS contacts as well, similar to 835 and/or 860 of FIG. 8. At 935, the target UE responds to the SIP OPTIONS message from the given UE with a SIP 200 OK message that indicates at least the RCS capability information of the target UE, and potentially the RCS capability information for one or more other RCS contacts that were identified in the SIP OPTIONS message (e.g., if the target UE has access to such information and is authorized to provide it to the given UE). The given UE updates the RCS capability information and associated timestamp for the target UE, 940. Also, if the SIP 200 OK message included RCS capability information for other RCS contacts, the given UE can update the RCS capability information and associated timestamp for the other RCS contacts as well, 945. After 945, the process returns to 915 where the timer is reset or extended based on the timestamp associated with the newly arriving RCS capability information from the target UE. While FIG. 9 is described above with respect to one particular target UE, it will be appreciated that FIG. 9 can execute in parallel for multiple target UEs, such that the given UE can maintain the RCS capability information for each of its RCS contacts at a target level of 'freshness' based on their respective priority levels.

While the embodiments are described above with respect to protocol-specific signals such as SIP OPTIONS, SIP 200 OK, etc., it will be appreciated that embodiments can be extended to any peer-to-peer RCS capability acquisition protocol, and is not limited to the particular protocol examples provided above.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:
1. A method of operating a user equipment (UE) configured to implement a rich communication suite (RCS) protocol, comprising:

configuring an RCS capabilities request message to request a first target UE to provide (i) RCS capability information for the first target UE, and (ii) RCS capability information for a set of one or more other UEs;

transmitting the configured RCS capabilities request message to the first target UE; and receiving, in response to the transmission, an RCS capabilities response message that indicates (i) the RCS capability information for the first target UE and (ii) RCS capability information for at least one UE from the set of one or more other UEs.

2. The method of claim 1, wherein the RCS capabilities request message corresponds to a session initiation protocol (SIP) OPTIONS message.

3. The method of claim 2, wherein the configured RCS capabilities request message requests the first target UE to provide the RCS capability information for the set of one or more other UEs by identifying the set of one or more other UEs within the SIP OPTIONS message.

4. The method of claim 3, wherein one or more UEs within the set of one or more other UEs are identified by an entire phone number, a hash of a phone number, an entire uniform resource identifier (URI) and/or a hash of a URI.

5. The method of claim 3, wherein the set of one or more other UEs are identified within a proprietary field of the SIP OPTIONS message or a SIP OPTIONS BLOB field.

6. The method of claim 1, further comprising:
determining to acquire the RCS capability information from the first target UE and the set of one or more other UEs; and
determining an order in which to the first target UE and the set of one or more other UEs are to be contacted to request their respective RCS capability information,
wherein the transmitting occurs in accordance with the determined order.

7. The method of claim 6, wherein a second target UE is earlier in the determined order than the first target UE, further comprising:
prior to the configuring, transmitting and receiving steps:
configuring a given RCS capabilities request message to request the second target UE to provide (i) RCS capability information for the second target UE, and (ii) RCS capability information for the second target UE and/or one or more other UEs from the set of one or more other UEs;
transmitting the configured given RCS capabilities request message to the second target UE; and
receiving, in response to the transmission of the given configured RCS capabilities request message, a given RCS capabilities response message that indicates (i) the RCS capability information for the second target UE and (ii) RCS capability information for at least one given UE from the second target UE and/or the one or more other UEs.

8. The method of claim 7,
wherein first RCS capability information for a given UE is received from the first target UE, and
wherein second RCS capability information for the given UE is received from the second target UE.

9. The method of claim 8, further comprising:
selecting one of the first and second RCS capability information based on which information is more recent; and
maintaining the selected RCS capability information on the UE.

10. The method of claim 6, wherein a second target UE is later in the determined order than the first target UE, further comprising:

after the configuring, transmitting and receiving steps:
configuring a given RCS capabilities request message to request the second target UE to provide (i) RCS capability information for the second target UE, and (ii) RCS capability information for the second target UE and/or one or more other UEs from the set of one or more other UEs;
transmitting the configured given RCS capabilities request message to the second target UE; and
receiving, in response to the transmission of the given configured RCS capabilities request message, a given RCS capabilities response message that indicates (i) the RCS capability information for the second target UE and (ii) RCS capability information for at least one given UE from the second target UE and/or the one or more other UEs.

11. The method of claim 10,
wherein first RCS capability information for a given UE is received from the first target UE, and
wherein second RCS capability information for the given UE is received from the second target UE.

12. The method of claim 11, further comprising:
selecting one of the first and second RCS capability information based on which information is more recent; and
maintaining the selected RCS capability information on the UE.

13. The method of claim 6, wherein the determined order is based upon a priority of the first target UE and/or the set of one or more other UEs.

14. The method of claim 6, further comprising:
determining, based on the received RCS capabilities response message, that acceptable RCS capability information is obtained for one or more UEs that are later than the first target UE in the determined order; and
skipping the one or more UEs in the determined order such that transmission of one or more RCS capabilities request messages to the one or more UEs is avoided based on the determination that the acceptable RCS capability information is obtained for the one or more UEs.

15. The method of claim 14,
wherein it is determined that acceptable RCS capability information is obtained for each UE in the determined order, and
wherein the skipping skips each remaining UE in the determined order in response to the determination that acceptable RCS capability information is obtained for each UE in the determined order.

16. The method of claim 1, wherein the configured RCS capabilities request message indicates RCS capability information for the UE.

17. The method of claim 16,
wherein the UE is aware of a version of RCS capability information for one or more additional UEs from the set of one or more other UEs prior to the transmission,
wherein the configured RCS capabilities request message further indicates the version of RCS capability information for the one or more additional UEs.

18. A method of operating a user equipment (UE) configured to implement a rich communication suite (RCS) protocol, comprising:
receiving an RCS capabilities request message from a requesting UE that is configured to request (i) RCS capability information for the UE, and (ii) RCS capability information for a set of one or more other UEs;

determining that the UE has access to RCS capability information for at least one UE from the set of one or more other UEs;

configuring an RCS capabilities response message that indicates (i) the RCS capability information for the UE and (ii) the RCS capability information for the at least one UE from the set of one or more other UEs; and transmitting the configured RCS capabilities response message to the requesting UE.

19. The method of claim 18, wherein the configured RCS capabilities request message corresponds to a session initiation protocol (SIP) OPTIONS message.

20. The method of claim 19, wherein the configured RCS capabilities request message requests the UE to provide the requesting UE with the RCS capability information for the set of one or more other UEs by identifying the set of one or more other UEs within the SIP OPTIONS message.

21. The method of claim 20, wherein one or more UEs within the set of one or more other UEs are identified by an entire phone number, a hash of a phone number, an entire uniform resource identifier (URI) and/or a hash of a URI.

22. The method of claim 20, wherein the set of one or more other UEs are identified within a proprietary field of the SIP OPTIONS message or a SIP OPTIONS BLOB field.

23. The method of claim 18, wherein the configured RCS capabilities request message indicates RCS capability information for the requesting UE.

24. The method of claim 23, wherein the configured RCS capabilities request message further indicates RCS capability information for one or more additional UEs other than the requesting UE.

25. The method of claim 18,
wherein the determining determines that the UE has access to RCS capability information for a given UE from the set of one or more other UEs, further comprising:
evaluating whether the UE has authority to notify the requesting UE with respect to the RCS capability information for the given UE.

26. The method of claim 25,
wherein the evaluation indicates that the UE has the authority to notify the requesting UE with respect to the RCS capability information for the given UE,
wherein the configuring includes the RCS capability information for the given UE within the RCS capabilities response message based on the evaluation.

27. The method of claim 25,
wherein the evaluation indicates that the UE does not have the authority to notify the requesting UE with respect to the RCS capability information for the given UE,
wherein the configuring omits the RCS capability information for the given UE from the RCS capabilities response message based on the evaluation.

28. A user equipment (UE) configured to implement a rich communication suite (RCS) protocol, comprising:
means for configuring an RCS capabilities request message to request a first target UE to provide (i) RCS capability information for the first target UE, and (ii) RCS capability information for a set of one or more other UEs;
means for transmitting the configured RCS capabilities request message to the first target UE; and
means for receiving, in response to the transmission, an RCS capabilities response message that indicates (i) the RCS capability information for the first target UE and (ii) RCS capability information for at least one UE from the set of one or more other UEs.

29. A user equipment (UE) configured to implement a rich communication suite (RCS) protocol, comprising:
means for receiving an RCS capabilities request message from a requesting UE that is configured to request (i) RCS capability information for the UE, and (ii) RCS capability information for a set of one or more other UEs;
means for determining that the UE has access to RCS capability information for at least one UE from the set of one or more other UEs;
means for configuring an RCS capabilities response message that indicates (i) the RCS capability information for the UE and (ii) the RCS capability information for the at least one UE from the set of one or more other UEs; and
means for transmitting the configured RCS capabilities response message to the requesting UE.

30. A user equipment (UE) configured to implement a rich communication suite (RCS) protocol, comprising:
a processor, a memory and/or a transceiver configured to:
configure an RCS capabilities request message to request a first target UE to provide (i) RCS capability information for the first target UE, and (ii) RCS capability information for a set of one or more other UEs;
transmit the configured RCS capabilities request message to the first target UE; and
receive, in response to the transmission, an RCS capabilities response message that indicates (i) the RCS capability information for the first target UE and (ii) RCS capability information for at least one UE from the set of one or more other UEs.

31. A user equipment (UE) configured to implement a rich communication suite (RCS) protocol, comprising:
a processor, a memory and/or a transceiver configured to:
receive an RCS capabilities request message from a requesting UE that is configured to request (i) RCS capability information for the UE, and (ii) RCS capability information for a set of one or more other UEs;
determine that the UE has access to RCS capability information for at least one UE from the set of one or more other UEs;
configure an RCS capabilities response message that indicates (i) the RCS capability information for the UE and (ii) the RCS capability information for the at least one UE from the set of one or more other UEs; and
transmit the configured RCS capabilities response message to the requesting UE.

32. A non-transitory computer-readable medium containing instructions stored thereon, which, when executed by a user equipment (UE) configured to implement a rich communication suite (RCS) protocol, cause the UE to perform operations, the instructions comprising:
at least one instruction configured to cause the UE to configure an RCS capabilities request message to request a first target UE to provide (i) RCS capability information for the first target UE, and (ii) RCS capability information for a set of one or more other UEs;
at least one instruction configured to cause the UE to transmit the configured RCS capabilities request message to the first target UE; and
at least one instruction configured to cause the UE to receive, in response to the transmission, an RCS capabilities response message that indicates (i) the RCS capability information for the first target UE and (ii) RCS capability information for at least one UE from the set of one or more other UEs.

33. A non-transitory computer-readable medium containing instructions stored thereon, which, when executed by a user equipment (UE) configured to implement a rich communication suite (RCS) protocol, cause the UE to perform operations, the instructions comprising:

at least one instruction configured to cause the UE to receive an RCS capabilities request message from a requesting UE that is configured to request (i) RCS capability information for the UE, and (ii) RCS capability information for a set of one or more other UEs;

at least one instruction configured to cause the UE to determine that the UE has access to RCS capability information for at least one UE from the set of one or more other UEs;

at least one instruction configured to cause the UE to configure an RCS capabilities response message that indicates (i) the RCS capability information for the UE and (ii) the RCS capability information for the at least one UE from the set of one or more other UEs; and at least one instruction configured to cause the UE to transmit the configured RCS capabilities response message to the requesting UE.

* * * * *